United States Patent
Vu et al.

(10) Patent No.: US 6,459,964 B1
(45) Date of Patent: Oct. 1, 2002

(54) TRAIN SCHEDULE REPAIRER

(75) Inventors: Thu V. Vu, West Melbourne; Paul Julich, Indiatlantic, both of FL (US)

(73) Assignee: G.E. Harris Railway Electronics, L.L.C., Melbourne, FL (US)

(*) Notice: Subject to any disclaimer, the term of this patent is extended or adjusted under 35 U.S.C. 154(b) by 0 days.

(21) Appl. No.: 09/083,157

(22) Filed: May 22, 1998

Related U.S. Application Data

(60) Continuation-in-part of application No. 08/787,168, filed on Jan. 23, 1997, now Pat. No. 5,749,172, which is a division of application No. 08/299,271, filed on Sep. 1, 1994, now Pat. No. 5,623,413.

(60) Provisional application No. 60/047,564, filed on May 22, 1997.

(51) Int. Cl.⁷ ............................ G06F 15/48; G06F 15/60
(52) U.S. Cl. ...................................................... 701/19
(58) Field of Search ..................... 246/122 R, 167 R, 246/2 R; 701/19, 20, 117, 204; 705/8

(56) References Cited

U.S. PATENT DOCUMENTS

| | | | |
|---|---|---|---|
| 4,122,523 A | * 10/1978 | Morse et al. ............... 364/436 |
| 4,179,739 A | * 12/1979 | Virnot ....................... 364/436 |
| 4,888,692 A | * 12/1989 | Gupta et al. ............... 364/402 |
| 4,926,343 A | * 5/1990 | Tsuruta et al. ............. 364/513 |
| 5,177,684 A | * 1/1993 | Harker et al. .............. 364/436 |
| 5,270,920 A | * 12/1993 | Pearse et al. .............. 364/401 |
| 5,623,413 A | 4/1997 | Matheson et al. |
| 5,659,734 A | * 8/1997 | Tsuruta et al. ............. 395/608 |
| 5,845,258 A | * 12/1998 | Kennedy ...................... 705/8 |

OTHER PUBLICATIONS

Hsien–Cheng Lin; Ching–Chi Hsu; An ineractive train scheduling workbench based on artificial intelligence, Nov. 6–9, 1994; Technol. Res. Div., Inst. for Inf. Ind., Taipei, Taiwan; pp. 42–48.*

Te–Wei Chiang ; Hai–Yen Hau; Railway Scheduling system using repair based approach, Nov. 5–8, 1995; Department of Electrical Engineering Taipei, Taiwan; pp. 71–78.*

* cited by examiner

Primary Examiner—Tan Nguyen
Assistant Examiner—Dalena Tran
(74) Attorney, Agent, or Firm—Duane Morris LLP

(57) ABSTRACT

The present invention relates to a predictive train scheduler that continually adjusts train routes and controls in real time so that train throughput on the railway system is optimized. The schedule repairer makes intelligent decisions through the collection of real time data as well as the use of predictive algorithms which are able to estimate potential conflicts, resolve the conflicts and leave the rest of the movement plan undisturbed in a very short amount of time.

19 Claims, 4 Drawing Sheets

TRAIN SCHEDULE REPAIRER

RELATED APPLICATIONS

This application is a continuation-in-part of U.S. Application Ser. No. 08/787,168, filed Jan. 23, 1997, now U.S. Pat. No. 5,749,172, which is a division of Application No. 08/299,271, Sep. 1, 1994, now U.S. Pat. 5,623,413.

This application claims the benefit of the priority of U.S. Provisional Application No. 60/047,564 filed May 22, 1997 and is assigned to the assignee of the present application.

BACKGROUND OF THE INVENTION

It is possible to dramatically increase the efficiency of train movements by optimizing the schedule of train movements to account for interactions between trains such as meets, passes, merges, and contention for terminal resources. One approach is embodied in the meet/pass planners incorporated in some current CAD systems. These meet/pass planners are actually decision-aids which assist an operator in making a decision over which train to place on which siding in order to resolve an impending conflict between trains. In Matheson et al. U.S. Pat. No. 5,623,413, issued Apr. 22, 1997, entitled "Scheduling System and Method", a new approach was proposed which provided a detailed schedule for each trains movements over an entire crew shift. Such a schedule is referred to in this document as a train movement plan. A train movement plan is defined as a detailed schedule for each train identifying each track element and switch that the train moves over and the time that such movement occurs.

Preparing a movement plan is a computationally intensive process which requires significant computer resources. Once the plan is prepared, it may be implemented either automatically or manually. Implementation involves coordination between the train crews operating the trains and the dispatcher (controller) who issues movement authorities and controls remotely controlled switches and signals. A movement plan provides the basis for automatically controlling signals and switches and ultimately forms the basis for automatic operation of the trains themselves. If in the course of implementing a plan, deviations from the plan occur, the movement plan may be damaged and no longer provide a solution to all train conflicts. Railroad operations must continue while a new plan is being prepared. A schedule repairer is a means of providing timely alterations to a damaged movement plan to account for deviations from the plan caused by mechanical failure, human failure, unforeseen activities, and incorrect data.

Generally, in prior art scheduling systems, the schedule of operation of the trains is fixed, often months in advance, based upon historic average trip times. Because the schedules are based upon averages it is not possible to schedule the details of meets and passes unless the rail traffic is very light.

Moreover, typical scheduling systems use a fixed set of priorities and routes resulting in only a minimal amount of flexibility to work around problems. These systems do not have the predictive intelligence to plan beyond the next few blocks as monitored by the signal system.

The typical scheduling system used to generate global movement plans utilize simulation techniques with a form of branch and bound search technique to generate conflict free fine grain schedules for the trains within the scope of the scheduling system. These scheduling systems are not amenable to solving the real time deviations experienced in implementing the movement plan due to time constraints. As such, the prior art scheduling systems can not account for conflicts in the schedule which are created due to deviations from the movement plan. Such conflicts are typically resolved through human intervention of the train dispatchers.

For example, a branch and bound based scheduling system may take several hours to generate a global movement plan. Accordingly, such fine grained movement plans may only be generated daily. Such a scheduling system is not capable of resolving conflicts that arise due to the normal deviations experienced in a railway system. Other approaches use a form of decision support tool in which a dispatcher may propose a solution to a conflict and view the ramifications of his solution. Such an approach is limited by the skill of the dispatcher and does not offer the growth to fully automatic operation.

For a further explanation of the utilization and the difficulties associated with scheduling systems, refer to the Matheson et al. U.S. Pat. No. 5,623,413, issued Apr. 22, 1997, entitled "Scheduling System and Method", and having some inventors in common with the present application.

The present invention incorporates predictive schedule repairing which will continuously adjust train routes and controls in real time so that system throughput is optimized. One advantage of this look ahead schedule repairer is that intelligent decisions can be made due to the collection of real time data as well as the use of predictive algorithms which are able to estimate potential conflicts, resolve the conflicts and leave the rest of the movement plan undisturbed in a very short amount of time.

One of the benefits of the present schedule repairer system is the improved throughput over the rail that results from planning efficient train movements. Unlike other approaches which require the entire schedule to be regenerated which can not dynamically revise portions of the movement plan, the present invention can rapidly react to changes in predicted needs and create a revised movement plan within thirty seconds. The schedule repairer constantly receives train performance data and compares that to the movement plan. Adjustments to the train movement plan may be accomplished frequently in order to stay current with the activities on the railway system.

A very important aspect with the use of precision scheduling is the ability to handle deviations from the movement plan when they occur. The most common problem with fixed schedules that are set up far in advance is that conflicts occur which cause elements of the network to get off schedule, and those off-scheduled elements will ripple through the system causing other elements to get off-schedule. For example, the late arrival of a train at a siding may delay the progress of another train which was being met at the siding, and this delay may cause the second train to arrive late for a meet with a third train. This cascading of effects, if not promptly addressed, often leads to track congestion with the result that crews exceed their time of service and terminals become congested with serious reductions in train performance. These ripple effects are common and the standard operating procedures for railroads task the dispatcher with manually taking action to minimize the impact. With the increasing traffic levels on today's railroads, this task exceeds the capability of all but the most competent dispatchers. Due to time constraints, other scheduling systems, and decision support systems are unable to revise the movement plan in sufficient time to resolve the conflicts while preventing the propagation effects described earlier.

A key element of the train schedule repairer system as provided by the present invention is that it has continuous monitoring of conflicts as they occur, and allows rescheduling to compensate for the presence of these conflicts in the affected portion of the movement plan in a timely fashion. This exception handling capability begins with the conflict being predicted and the available options for the effected trains identified. The available options for the effected trains are evaluated to determine which option will cause the least impact to the rest of the movement plan. Once an option is selected the schedules for the effected trains are adjusted. The movement plan is then evaluated for any conflicts which may have been caused by the adjusted schedules. If a conflict is predicted, the schedule repair cycle just described repeats itself until the adjusted schedules result in a conflict free movement plan. In order to control the number of iterations required to develop a conflict free movement plan, the schedule repair horizon can be constrained so that any conflicts which arise beyond a set time horizon are not resolved in the current repair cycle.

For example, a given train which has deviated from its plan in excess of a predetermined tolerance could cause a conflict that could be corrected simply by small changes to the adjacent trains. On the other hand, an event of a larger magnitude such as a derailment which fouled a given track would cause a large scale rescheduling including the determination and evaluation of multiple options affecting the entire railway system within the scope of the schedule repairer. Such large scale rescheduling would require system wide replanning and course adjustments to the movement plan beyond the scope of the schedule repairer. In such a situation the schedule repairer takes action to minimize the development of future congestion caused by the event. Such action might cause the schedule repairer to direct a train to a siding at its current position rather than allowing it to continue progressing in its trip plan and thereby creating future congestion.

There is a temporal aspect to this rescheduling activity in that the conflict being reported must be acted on immediately for safety reasons, without the determination and evaluation of available options. Once the conflict is acted upon, the schedule repair can determine the options available based on this recently initiated safety action. For example, if a train derails on a segment of track, the schedule repairer may direct that trains in close proximity that may block access to the scene be stopped prior to determining the effect of the loss of the track on the overall movement plan. Moreover, the schedule repair can ensure that the track segments leading up to the derailment location are kept clear of traffic to allow repair apparatus rail access to the derailment location. However, the schedule repairer would not be used to make large scale revisions to the global movement plan. Rather a course scheduler could be used to make large changes to the movement plan before the schedule repairer makes the necessary fine grain revisions to avoid any potential conflicts due to the large scale revision. Thus, the conflict resolution or exception handling process can be involved in various levels of a hierarchial planning system in time sequence until the conflict is fully resolved.

In the typical scheduling system, the most common effect of an unexpected event is to negate large portions of a predetermined schedule. Unfortunately, events happen with great frequency, some of them as small as loss of one locomotive in a three locomotive consist, which causes that train to have two thirds the power for which it had been scheduled. Or deviations from a movement plan are created because the engineer has not attempted, or been unable, to stay on schedule. Without regard to the cause, they occur with great frequency and as a result most freight railroads do not maintain any sort of close coupling with predetermined schedules.

In the schedule repair process it is important to understand the total scope of what is necessary to actually achieve the optimal plan. In the schedule repairer, once a conflict is predicted various options are evaluated. Generally, the option which impacts the rest of the movement plan the least is selected. However, optimization plans can be factored in where certain elements of the operation (certain trains or certain types of shipments) are given a higher priority than others because of the fact that they are considered to be more time critical. These type of business rules can be considered when the options are selected.

Accordingly, it is an object of the present invention to provide a novel method of making fine grain revisions to a movement plan.

It is another object of the present invention to provide a novel method of identifying conflicts that arise due to deviations from the movement plan.

It is yet another object of the present invention to provide a novel method of evaluating the effect of various options on the overall movement plan.

It is still another object of the present invention to provide a novel method of selecting the options which minimize the impact on the rest of the movement plan.

It is yet a further object of the present invention to provide a novel method of evaluated the adjusted schedules of individual trains to determine whether conflicts are predicted.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
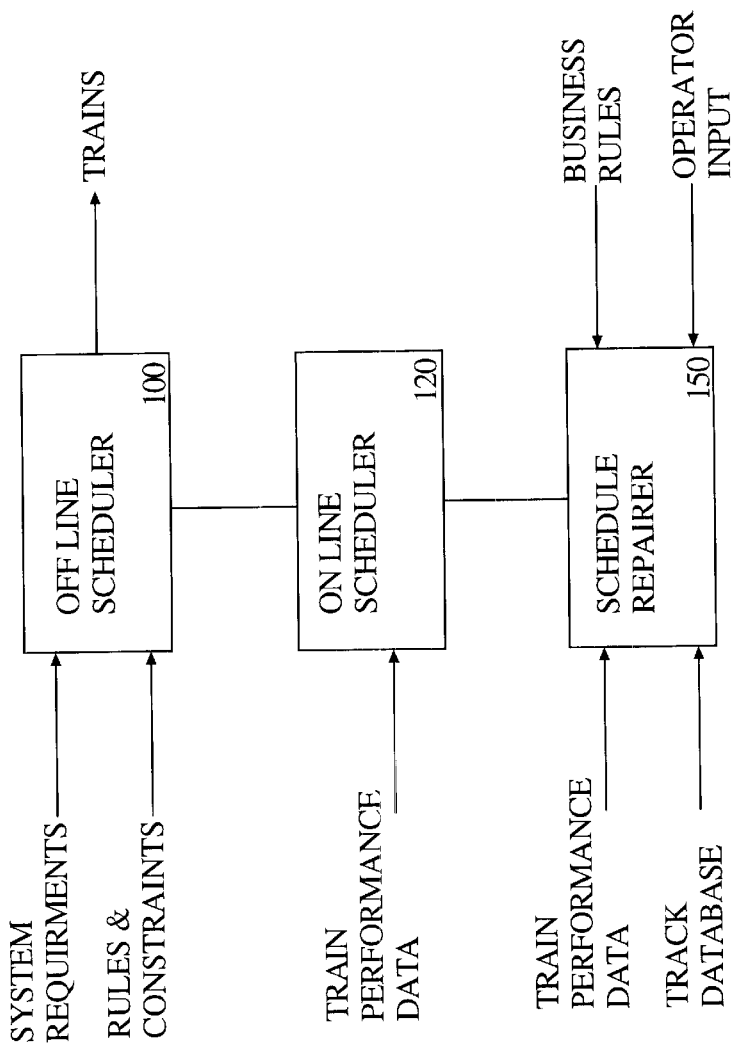
FIG. 1 is a simplified block diagram of a scheduling system which utilizes the Schedule Repairer system and method of the present invention.

With reference to FIG. 1, the present invention may be an integral part in the hierarchical scheduling system used for a railway system. Off line scheduler 100 generates departure and arrival times for all trains within the scope of the scheduling system based upon historic averages for the trip times. This fixed schedule may be passed to an on line scheduler 120 ten to twelve hours prior to the train's departure and a movement plan for the train is computed. This movement plan may be re-generated at regular intervals (approximately once per hour) during the course of the trip. As the train progresses through its trip, its location is measured by conventional train sensing devices in the track or through the train reporting its position through a data link between the train and the control center which monitors the real time deviations from the movement plan. Any deviations are passed to schedule repairer 130 to determine if the deviations result in conflicts to the movement plan.

With continued reference to FIG. 1, the off line scheduler 100 may receive input of market driven transportation requirements and utilize manual or automatic means to generate arrival and departure times based upon historic or estimated average performance data. This train schedule does not consider the movement of other trains directly and therefore the schedule may contain latent conflicts. The technique used to generate the system schedule is computationally intensive and may take many hours several hours to complete.

In a preferred embodiment, the on line scheduler 120 receives the arrival and departure schedule from the off line scheduler 100. The on line scheduler utilizes precomputed performance data for each train to build an abstract model based upon time of travel over each track and switch element. The on-line scheduler builds a detailed movement plan for each train in the schedule. This movement plan identifies each track element and switch over which the train travels and reserves the track element to assure that there are no contentions between trains for the track resources. The on line scheduler 120 can prepare the global movement plan quickly (within 30 minutes). However, the on line scheduler 120 is only capable of making coarse adjustments to the global movement plan, and therefore does not evaluate or resolve conflicts which may arise due to the coarse revisions to the movement plan. The on line scheduler 120 may use a planning horizon of 12 hours and can make a new global movement plan every hour.

The coarse movement plan from the on line scheduler 120 can be passed to the schedule repairer 150. In one embodiment of the present invention, the schedule repairer 150 makes fine grain adjustments to the movement plan by using a conflict predictor algorithm. The schedule repairer 150 first determines if a conflict exists. It then may generate several options and then select that option which minimizes the impact on the global movement plan.

Figure 2:
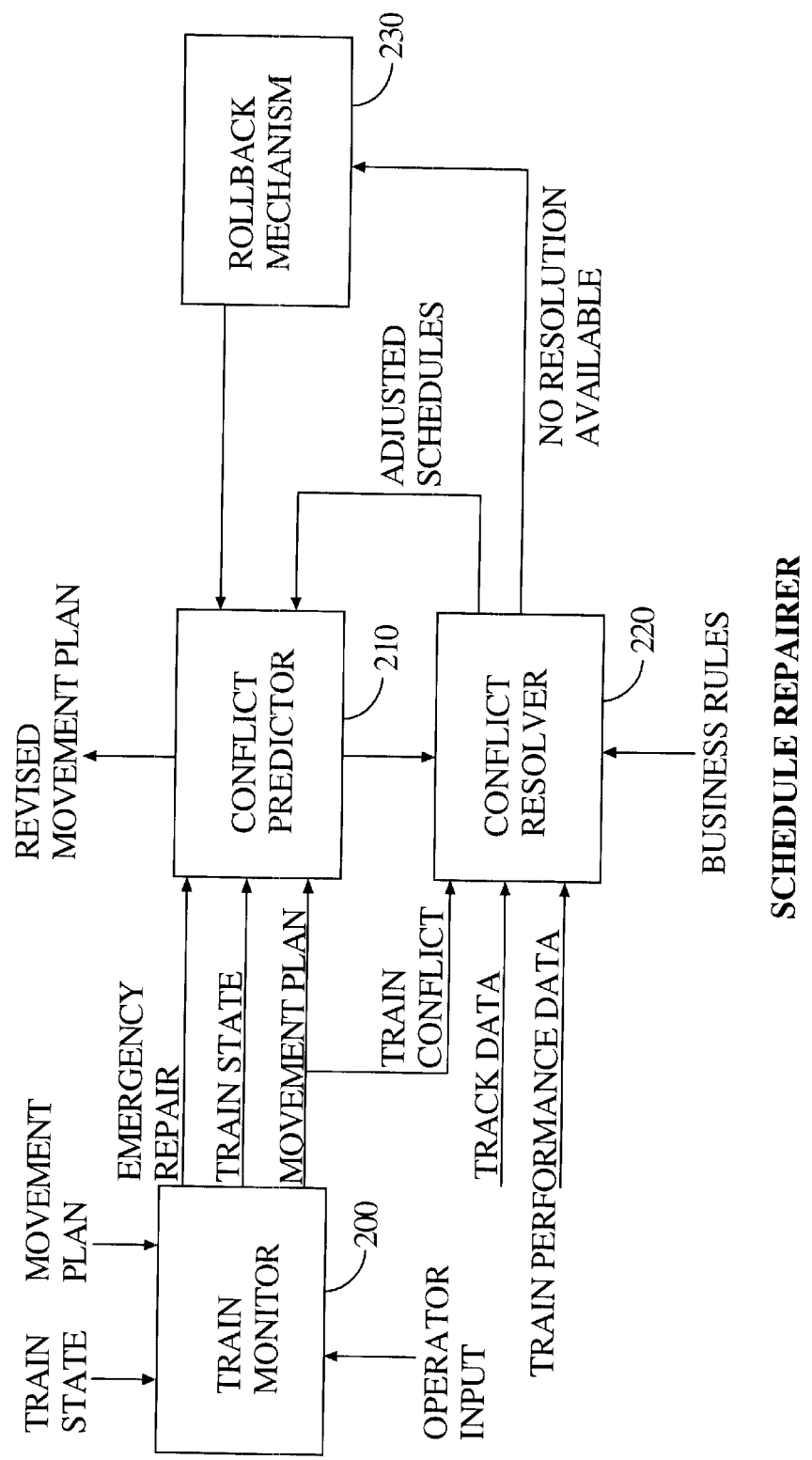
FIG. 2 a simplified block diagram of the major components of the Schedule Repairer system and method which may be used in the scheduling system of FIG. 1.

With reference now to FIG. 2, the schedule repairer 150 of the present invention may include a train monitor 200, a conflict predictor 210, a conflict resolver 220 and a rollback mechanism 230.

In operation, each train operating within the purview of the schedule repairer 150 is subject to a schedule associated with the global movement plan. A train monitor 200 tracks all trains in the system. In a preferred embodiment of the present invention, each train may be identified buy its ID number, train name, train type, current status, current location, speed, direction of travel and time when the train will enter the next track segment. The train monitor 200 tracks a train as it progresses against the movement plan and passes any deviation to the conflict predictor 210.

For example, if a train deviates from its schedule by more than a predetermined amount of time, conflict predictor 210 will initiate a repair cycle to determine if other trains will be impacted by the schedule deviation. Conflict predictor 210 will pass any predicted conflicts to conflict resolver 220 if the schedule of the affected trains requires adjustment.

Alternately, an operator may input the occurrence of a major event into train monitor 200 which has the potential for disrupting the movement plan. Such events include accidents, a train stalled on the tracks, a broken rail, etc. In this event, the train monitor 210 will initiate immediate action without the determination of the effect on the movement plan.

Figure 3:
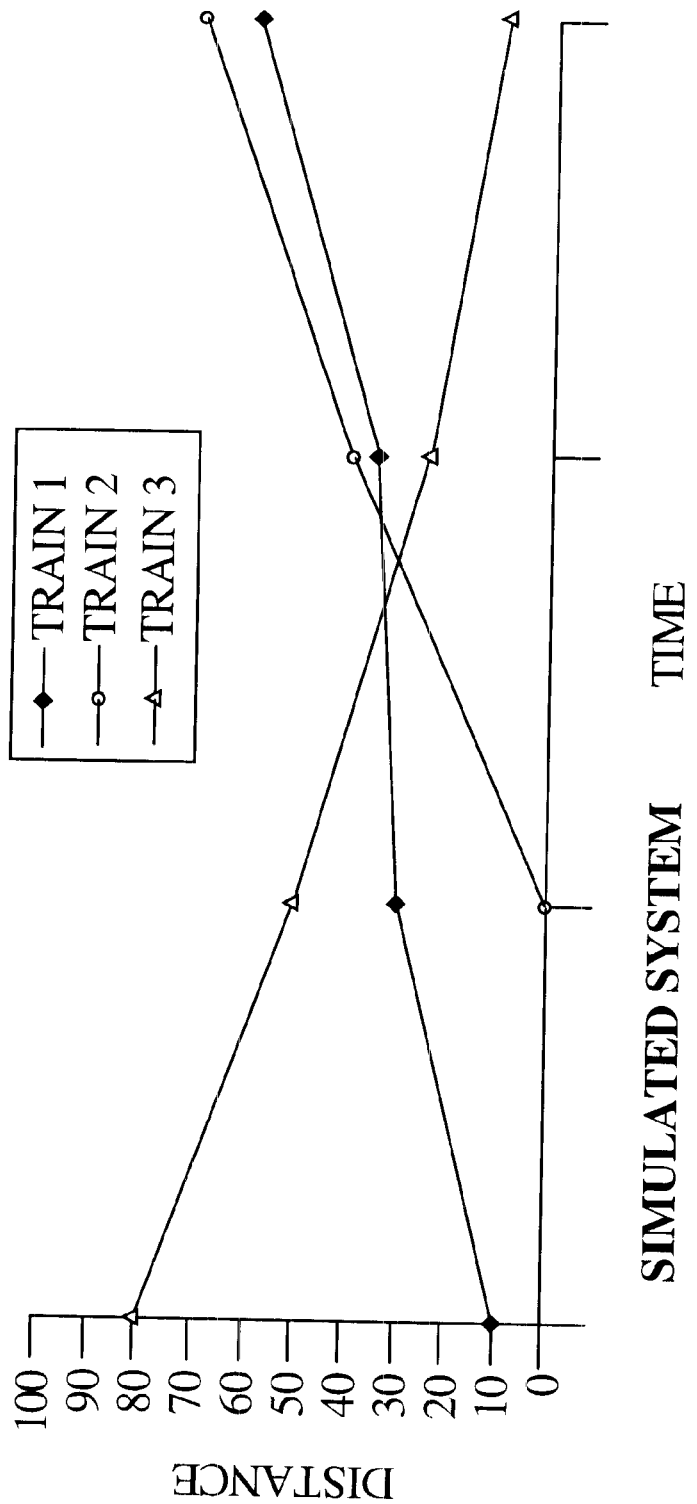
FIG. 3 is a simplified graphical representation of the predictive method used by the conflict predictor of FIG. 2.

With continued reference to FIG. 2, the conflict predictor 210 uses the trains' performance data and the movement plan to determine if a schedule conflict exists. For example, with reference to FIG. 3, conflict predictor 210 maintains a simulated system time representing some time based in the future corresponding to the movement plan, and estimates each train's position for a given segment of track based on the simulated time. For a given segment of track, there is a location along that segment of track for each train that will occupy that segment that corresponds to the simulated system time which defines the track usage interval for that segment. The intersection points of two or more trains would represent potential conflicts between trains and the time and location of the conflict would be indicated as an overlapping track usage interval. During the repair cycle, the conflict predictor 210 can advance the simulated time to predict when and where the next conflict will occur. If no conflict is detected, the schedule does not need repair and the movement plan is returned unchanged. If a conflict is detected, the earliest conflict in time will be identified and resolved first. The identified conflict is passed to the conflict resolver 220, which will modify the movement plan to remove the identified conflict. Upon resolution of the predicted conflict, the conflict predictor 210 will continue searching for conflicts until the pre-specified planning horizon is reached.

With reference now to FIG. 2, if the conflict resolver can not resolve a potential conflict, rollback mechanism 230 may roll back the simulated system time to reconsider the resolution of the prior conflict in an effort to find a solution to all conflicts.

Figure 4:
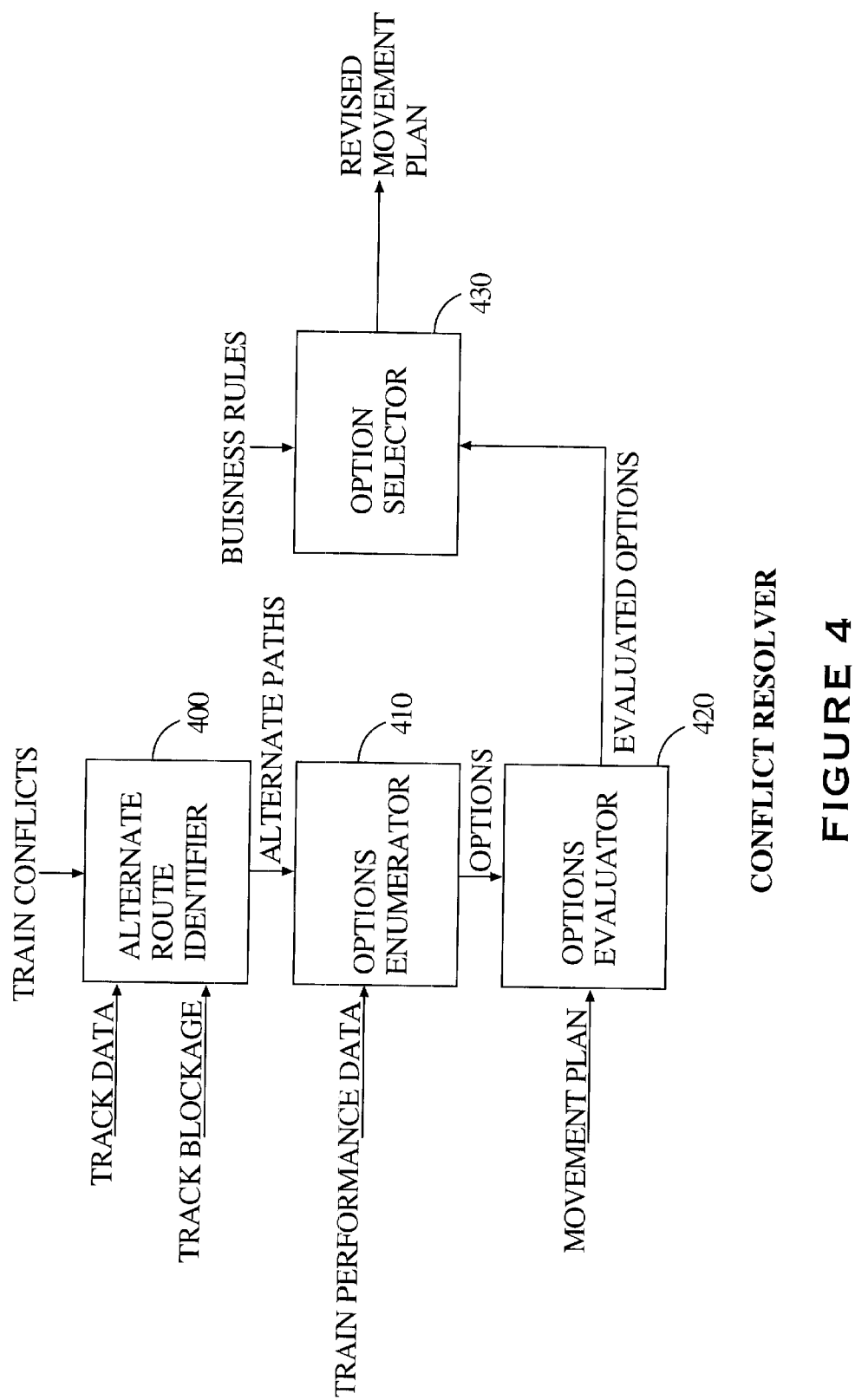
FIG. 4 is a simplified block diagram of a conflict resolver which may be used in the Schedule Repairer system of FIG. 2.

With reference now to FIG. 4, the conflict resolver 220 is comprised of the alternate route identifier 400, the options enumerator 410, the options evaluator 420 and the options selector 430.

In operation, the alternate route identifier 400 receives the identified conflicts passed by the conflict predictor 210. The alternate route identifier 400 searches the track database to identify alternate routes for each train affected by the conflict. These alternate routes identified for each train involved in the conflict are passed to the options enumerator 410. Options enumerator 410 identifies each alternative action which may be taken to resolve the conflict. This includes selecting paths with some mutually exclusive track resources and adjusting each trains' schedule to obtain a schedule which avoids simultaneous need for the same track or terminal resource. Other options include having one of the trains wait before a switch where its route merges into the route of another train, or stopping one of the trains on a siding. Each option carries with it an associated effect on the global movement plan. If no options are available for resolving a conflict, the options enumerator 410 may notify the operator or alternately roll back the clock to reconsider the resolution of a prior conflict in an effort to find a solution for all conflicts.

Once the options are enumerated, the option evaluator 420 evaluates the impact of each enumerated option on the movement plan based upon train performance data, business rules, and railroad specific rules. Train performance data may include the time a train will occupy each segment in its path. Additionally, the option selector 430 may factor in the priority associated with business rules, train performance or railroad specific rules which serves to influence responses in certain situations.

For example, a deviation by train A from the movement plan may generate a predicted conflict with train B. Option enumerator 410 may generate two options to resolve the conflict. Option evaluator 420 analyzes each option to determine its impact on the global movement plan. Option 1 results in the loss of ten train minutes. Option 2 results in the loss of 18 train minutes. The options and their effects are passed to the option selector. Assuming any applicable business rules do not influence the decision, option selector 430 would revise the movement plan with Option 1.

Once the option selector 430 has chosen an option for resolving predicted conflict, the revised movement plan returns to the conflict predictor 210 to continue to search for other potential conflicts. This iterative conflict predictive method may continue until all conflicts are resolved. The length of the repair cycle can be altered by adjusting the schedule repair horizon. In a preferred embodiment of the present invention the schedule repair horizon is between two to four hours and the repair cycle lasts approximately thirty seconds. When the repair cycle is completed, the revised movement plan is complete and may be used to control the progress of trains. While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of revising the movement plan which controls the schedule of plural trains over a predetermined layout comprising the steps of
   (a) determining deviations from the movement plan, by evaluating real time train performance data against the move plan;
   (c) predicting an earliest conflict between one or more trains based on said deviations;
   (d) enumerating at least one option which eliminates said earliest conflict;
   (e) evaluating said at least one enumerated option by determining an impact on the movement plan; and
   (f) revising said movement plan by selecting an option which impacts the movement plan the least without consideration of any conflicts which may result from the selected option.

2. The method of claim 1 where said predicting comprises advancing the simulated system time until two trains occupy the same location for a given track segment.

3. The method of claim 1 wherein said enumerating comprises the identification of alternate paths for the trains.

4. The method of claim 1 wherein said step of evaluating is performed without executing simulations of the trains along the predetermined layout.

5. A system for revising a movement plan of plural trains along a network of track comprising:
   means for evaluating an adherence of each train to the movement plan;
   means for predicting an earliest conflict in schedules due to any train not adhering to the movement plan;
   means for enumerating options to resolve said earliest conflict;
   means for evaluating the enumerated options; and
   means for revising said movement plan by selecting one of said options without consideration of any conflicts which may result from the selected option.

6. The system of claim 5 further comprising the means for predicting conflicts due to the revision of said movement plan.

7. A system for scheduling and controlling the operation of plural trains over a predetermined control area comprising:
   a system scheduler which generates a coarse grain schedule applicable to each train within the control area during a predetermined period of time;
   a movement planner which generates a fine grain movement plan, said movement planner simulating the times of transit of each train over the applicable segments of track within the control area during said predetermined period of time;
   a dispatch subsystem which controls the trains within the control area in accordance with the current fine grain movement plan;
   a conflict predictor which monitors the progress of the trains against the fine grain schedule and identifies conflicts between trains in the use of the track;
   a conflict resolver which identifies and selects from optional resolutions to the identified conflict without consideration of any conflicts which may result from the selected option;
   movement plan update subsystem which updates the movement plan to implement the selected optional resolution.

8. The system of claim 7 wherein said conflict resolver comprises:
   an options enumerator which determines alternative routing which a train may utilize to achieve its desired destination;
   an options evaluator which evaluates the options enumerated by the options enumerator; and
   an options selector which selects the option evaluated as being the best.

9. The system of claim 8 wherein said options evaluator evaluates the options using previously determined train performance data and business rules.

10. The system of claim 8 wherein said options evaluator evaluates the options without executing simulations of the trains running over track segments.

11. In a method for revising a movement plan for plural trains over a predetermined layout by the steps of monitoring real-time train performance, detecting deviations from the movement plan, predicting scheduling conflicts caused by the detected deviations from the movement plan, identifying options for resolving the conflicts, evaluating the impact of each identified option on the movement plan and selecting an identified option on the basis of the impact evaluation, the improvement comprising the limiting of the evaluation to consideration of only a first predicted conflict to thereby select an option for the first predicted conflict without consideration of any conflicts which may result from the selection of the option.

12. In a method for revising a movement plan of plural trains due to expected deviations caused by an inability of the plural trains to adhere to a schedule by the steps of monitoring real-time train performance, detecting deviations from the movement plan, predicting scheduling conflicts caused by the detected deviations from the movement plan, identifying options for resolving the predicted conflicts, evaluating the impact of each identified option on the movement plan and selecting an identified option on the basis of the impact evaluation, the improvement wherein the step of evaluating is limited to consideration of the predicted conflicts sufficiently proximate to the time of evaluation to insure the selection of an option for the first predicted conflict within a predetermined time interval.

13. The method of claim 12 wherein the predetermined time interval is a function of the computational speed available and the proximity of an anticipated conflict resulting from (i) the implementation of the selected option, and (ii) expected further deviations from the movement plan.

14. A method of resolving conflicts in the scheduling of the movement of plural trains over plural tracks comprising the steps of:
   a. providing an optimized global movement plan consisting of a schedule of train movements;
   b. monitoring real-time performance data for each train as the trains move over the plural tracks;
   c. estimating a future location of each train based on a movement plan and the monitored real-time performance data;
   d. translating the estimated location of each train of each train into a track usage interval;
   e. identifying an earliest occurring overlapping track usage interval between trains;
   f. determining available options for eliminating the identified earliest occurring overlapping track usage interval;
   h. evaluating each of the determined options to determine an impact on the movement plan;
   i. selecting an option which impacts the movement plan the least without consideration of any conflicts which may result from the implementation of selected option; and
   j. modifying the movement plan to implement the selected option.

15. The method of claim 14 wherein the step of determining available options includes identifying an alternate train route for each train associated with the selected overlapping track usage.

16. The method of claim 14 wherein the step of modifying the movement plan includes adjusting the schedule of train movements of one or more of the trains associated with the selected overlapping track usage.

17. The method of claim 14 wherein the step of evaluating available options considers previously determined train performance data and business rules.

18. The method of claim 14 further comprising the step of sequentially eliminating overlapping track usage intervals by repeating steps (b) through (j) until no overlapping track usage intervals exist for a predetermined planning horizon.

19. The method of claim 18 comprising the farther step of selecting a different one of the determined options for the previously selected track usage overlap if there are no determined options for the currently selected track usage overlap.

* * * * *